June 26, 1951 R. W. POINTER 2,558,381
SINGLE AXLE VEHICLE SUSPENSION
Filed Nov. 28, 1945 2 Sheets-Sheet 1
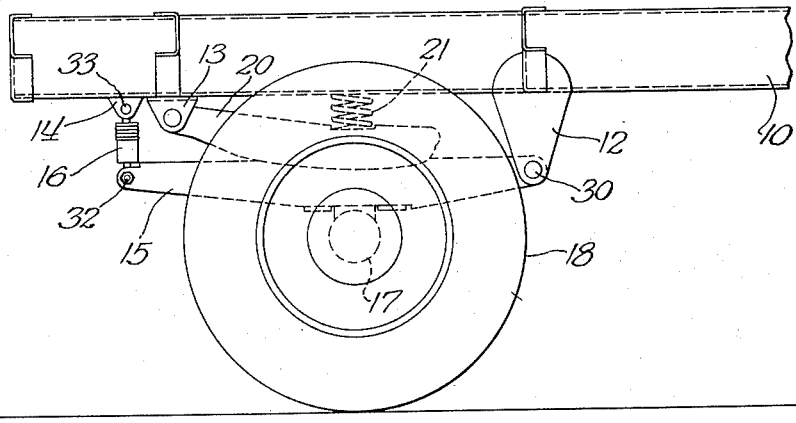
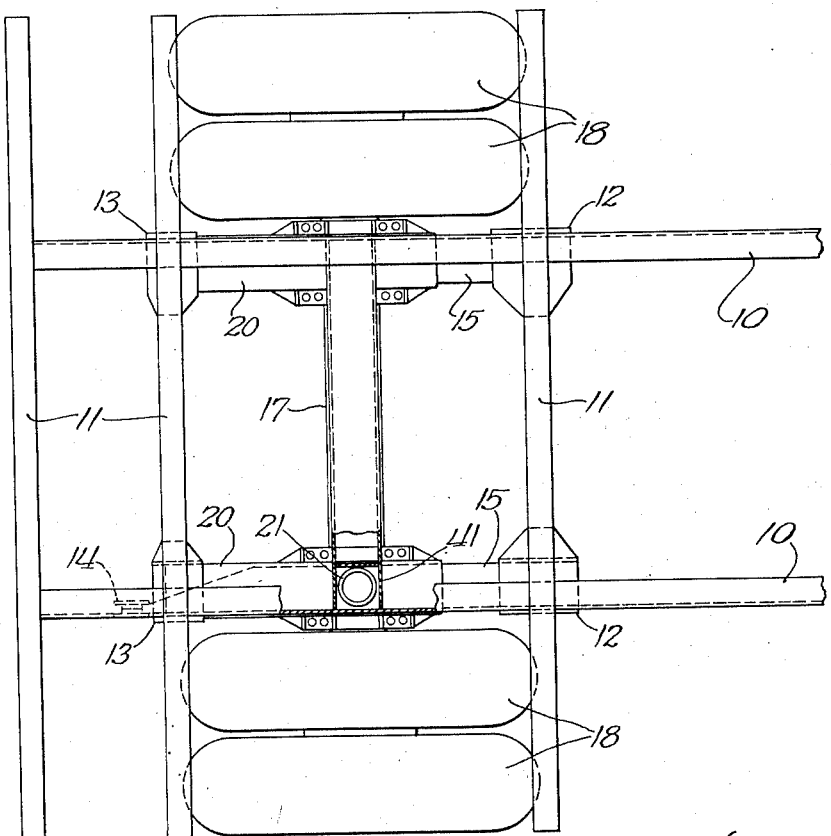
Robert W. Pointer
INVENTOR
BY Harold D. Cook
ATTORNEY June 26, 1951  R. W. POINTER  2,558,381
SINGLE AXLE VEHICLE SUSPENSION
Filed Nov. 28, 1945  2 Sheets-Sheet 2
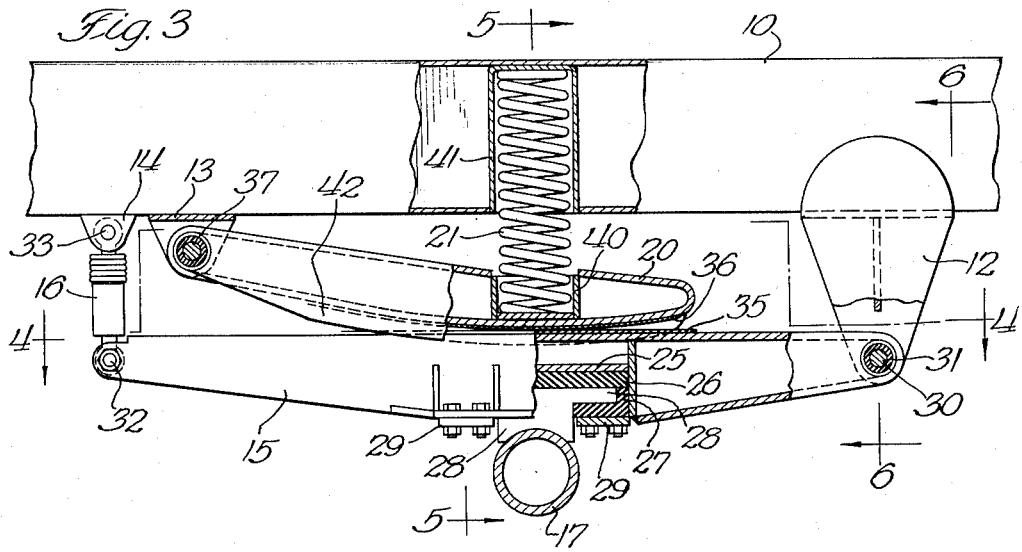
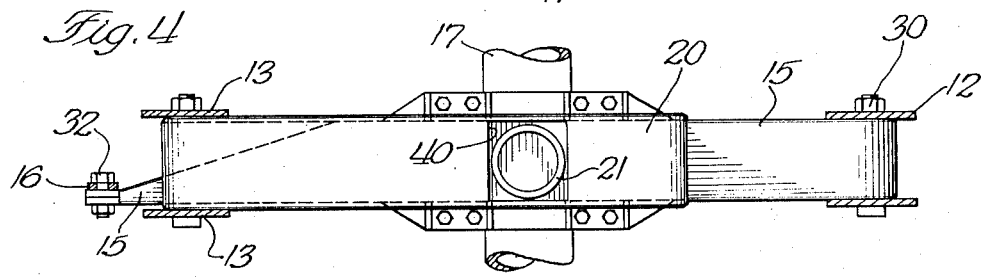
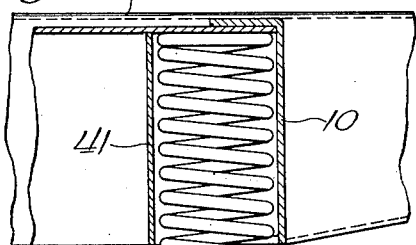
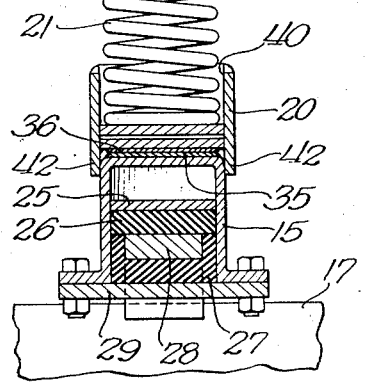
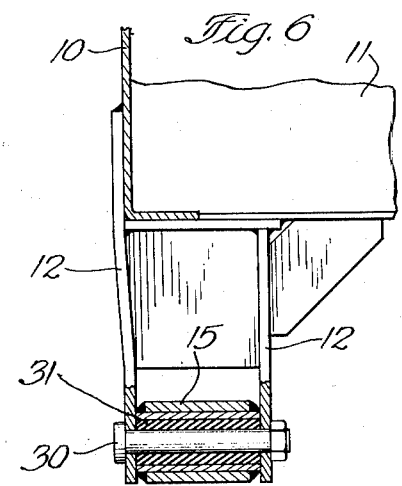
Robert W. Pointer
INVENTOR
BY Harold D. Cook
ATTORNEY Patented June 26, 1951

2,558,381

UNITED STATES PATENT OFFICE 2,558,381

SINGLE AXLE VEHICLE SUSPENSION

Robert W. Pointer, Portland, Oreg.

Application November 28, 1945, Serial No. 631,291

5 Claims. (Cl. 267—20)

This invention relates to improvements in vehicle suspensions, and has particular reference to a novel single axle suspension for vehicles such as trailers and the like.

The general object of the invention is to provide an improved suspension having a novel spring action which is free of objectionable characteristics present in conventional vehicle spring suspensions.

Load carrying vehicles, in particular, ordinarily impose somewhat inconsistent requirements upon the suspension system which are difficult to fulfill. One of the requirements of such a suspension system is that it shall operate effectively whether the vehicle be entirely empty, fully loaded, or only partly loaded. Spring action for such variable loading must be obtained with a limited range of movement of the parts so that there will not be a wide variation in the height of the vehicle frame above the road under different loads. There must be some control of the spring action to prevent the full collapse and bottoming of the springs under ordinary road shocks, and yet the spring action should be relatively free and soft for good riding qualities on normal road surfaces. Another requirement is that the springs shall not have a tendency to continue oscillation at some natural frequency which would set up a dangerous condition of vibration. As a final controlling factor in equipment design, a satisfactory vehicle suspension must meet and satisfy all the foregoing requirements in a simple and rugged mechanical structure which is economical to manufacture and maintain.

More specifically, then, the object of the invention is to provide a novel and practical construction which will best satisfy all the requirements enumerated above.

In carrying out the above objects, a further object is to provide a coil spring suspension having a variable effective spring rate to provide the proper spring action whether the vehicle be empty or fully loaded.

A further object is to provide a coil spring suspension wherein the spring action is exerted through a beam system whose mechanical advantage or leverage varies in accordance with the load supported thereon.

Another object is to provide a coil spring suspension having means to automatically vary the effective spring rate as the spring is compressed to prevent the occurrence of natural frequencies of oscillation.

Another object is to provide a dual beam suspension for a single axle wherein the reaction force of the supporting axle is transmitted from one beam to the other and thence to the spring by a rocking contact between the two beams to vary the leverage exerted on the spring in accordance with the spring deflection.

A still further object is to provide a dual beam suspension wherein the spring action is transmitted from a rocking beam to a walking beam and the movements of the walking beam are controlled by a shock absorber.

These and other objects and advantages will become apparent as the description proceeds with reference to a preferred embodiment of the invention illustrated in the accompanying drawings. Various changes may be made in the construction and arrangement of parts without departing from the spirit of the invention, the same including all such modifications within the scope of the appended claims.

In the preferred embodiment a single road wheel axle is cushion mounted on each side of the vehicle intermediate the ends of a walking beam having pivotal connection at one end with the frame of the vehicle. The other end of the walking beam is connected with the vehicle through a shock absorber unit. Bearing upon the walking beam in the region above the axle is a rocking beam also pivoted to the frame of the vehicle, the rocking beam having a spring seat directly over the axle carrying a coil spring supporting the vehicle frame, the arrangement being such as to provide a light underload spring action for springing the vehicle when it is carrying no load. However, when the spring is compressed under a heavy load, the rocking beam rocks upon the walking beam to shift its point of contact therewith toward the fulcrum of the rocking beam and away from the fulcrum of the walking beam to materially increase the mechanical advantage of the spring action upon the axle. This novel rocking action has the desirable effect of rapidly increasing the effective spring rate under a relatively small deflection to provide a heavy load supporting ability with a relatively light spring. Another desirable result accomplished by the rocking action between the two beams is the suppression of natural vibration frequencies which might be harmful to the vehicle.

This construction is best understood with reference to the accompanying drawings, in which:

Figure 1 is a fragmentary view in side elevation of a vehicle embodying the present invention;

Figure 2 is a plan view of that part of the vehicle shown in Figure 1, certain parts being broken away;

Figure 3 is an enlarged view of the operating parts of the suspension system shown in side elevation, with certain parts broken away to show the internal construction;

Figure 4 is a view looking down upon the two beams, taken on the line 4—4 in Figure 3;

Figure 5 is a transverse sectional view taken on the line 5—5 of Figure 3; and

Figure 6 is a sectional view through the walking beam bracket taken on the line 6—6 of Figure 3.

The vehicle frame comprises, generally, a pair of longitudinal members 10 interconnected by a plurality of transverse members 11. Brakets 12, 13 and 14 are secured to the longitudinal members 10 on each side of the frame for pivotally attaching a pair of interengaging beams of the suspension system. The lower of these beams is the walking beam 15 which is pivotally connected at one end with the bracket 12, and is connected at its other end with the bracket 14 through a shock absorber unit 16. An axle 17 carrying road wheels 18 is mounted in cushion seats in mid portions of the walking beams 15 on opposite sides of the vehicle. The bracket 13 provides pivotal support for one end of a rocking beam 20 bearing upon the upper side of the walking beam 15 in a rocking contact in the region generally above the axle 17. The spring suspension of this system comprises a single coil spring 21 supporting each of the longitudinal frame members 10 in a spring seat in one of the rocking beams 20 directly above the axle. The construction of these various parts will now be described with reference to the several detail views shown on the drawings.

The cushion seat mounting of the axle 17 in the walking beam 15 is shown in Figure 3. Each cushion seat comprises a seat or recess 25 in a mid portion of the walking beam, carrying a plurality of rubber blocks 26 and 27 surrounding a T casting 28 on the axle. Clamping plates 29 secure the parts in assembled relation so that the axle is allowed only the freedom of movement afforded by the resilience of the rubber blocks. This cushion seat axle mounting is disclosed and claimed in my Patent No. 2,238,002, entitled Cushion Seat for Trailer Axle, dated April 8, 1941.

The forward end of the walking beam 15 is pivotally connected with the bracket 12 through a pin 30 in a rubber bushing 31, as shown in Figure 6. The rear end of the walking beam is connected with the bracket 14 through an aircraft type shock absorber link 16 having rubber bushed pin or bolt connections at 32 and 33. A wear plate 35 reinforces the flat upper side of the walking beam and provides bearing for the rocking beam 20 the rocking surface of which is reinforced with a similar wear plate 36. A rubber bushed pin 37 connects the rocking beam 20 for pivotal motion on the bracket 13 under the play of the spring action so as to rock upon the top of the walking beam. A well or box 40 in the rocking beam provides a recessed spring seat for the lower end of spring 21 directly above the axle, and a similar box 41 in the frame member 10 seats the upper end of the spring and forms a guide for a substantial portion of its length to prevent buckling. Side plates 42 are provided on the rocking beam 20 of a greater depth than the beam itself so as to slightly overhang the sides of the walking beam 15 to maintain the two beams in vertical alignment during rocking movements as shown in Figure 5.

Figure 3 shows the positions of the beams under minimum load conditions, as when only the weight of the empty vehicle is resting upon the axle. In this condition the leverage ratio of the spring with respect to the axle is approximately 1:1, inasmuch as the spring bears upon the walking beam 15, through the rocking beam 20, directly above the supporting axle 17. The effective spring rate, expressed in terms of deflection per unit of weight increase on the vehicle, is a maximum in this condition, which is desirable to provide a soft spring for the empty vehicle. This spring rate is made to correspond somewhat to the spring rate which would be selected for underload springs intended to support only the empty vehicle.

When the vehicle is loaded, the shock absorber 16 and the spring 21 are compressed, allowing the frame member 10 to settle downwardly toward the axle 17. Such relative movement between the frame member 10 and the axle 17 is accommodated by a rocking motion of the rocking beam 20 upon the walking beam 15, causing the line of contact between the two beams to travel back toward the fulcrum 37 and away from the fulcrum 30. When such a shift occurs in the contact between the two beams, the mechanical advantage and the effective spring rate of the supporting spring 21 are greatly affected. In the first place, the spring leverage on the rocking beam 20 is increased because the length of the lever arm between its fulcrum 37 and the contact with the walking beam 15 is shortened. Then, in addition, the spring leverage on the walking beam 15 with respect to the axle is also increased by the movement of the contact of the rocker beam 20 farther from the fulcrum 30. The contour of the rocking surface on the rocking beam 20 is such that a slight compression of the spring is effective to shift the point of contact between the beams a considerable amount, to re-balance additional load with a small deflection so that there is no great variation in the height of the vehicle in loaded and unloaded conditions.

Thus it is seen that the application of a load to the vehicle changes the mechanical advantage of the suspension system to greatly vary the effective spring rate under a heavy load, just as though a series of heavy springs were automatically interposed in succession as the load increased. For this reason the spring 21 may be a relatively light spring such as might be used for directly supporting only the empty vehicle. The effect of adding weight on the vehicle is to progressively change the mechanical advantage of the beam linkage between the axle and the spring so that the spring will still be adequate to support the increased load, the rocking beam resting in a position of equilibrium such that the spring force balances the upward reaction of the axle transmitted to the spring through the beams. This characteristic not only has the advantage of enabling a single spring to perform the functions of both underload and main springs, but also possesses the unique advantage and characteristic of so altering the spring action that the system no longer possesses natural vibrational frequencies such as characterize a simple spring. The natural frequency of the system is obviously very different when the rocking beam is rocked back toward its fulcrum 37 and away from the walking beam fulcrum 30, than when the spring bears substantially directly upon the axle as shown in Figure 3. Any oscillation forced upon the spring encounters both of these conditions alternately in each cycle of oscillation so that any particular frequency possibly finding a resonant condition present in one part of the cycle would be damped out by the different condition present in another part of the cycle. The system is thereby inherently self-damping so that harmful oscillations cannot be set up at any frequency. The greater the amplitude the greater is the damping effect, contrary to the vibration laws for simple springs. The shock absorber 16, being connected at the extreme end of the long walking beam 15, is also in a position to exert its greatest possible effect in absorbing road shocks and damping spring oscillations.

The present suspension system is rugged and reliable in operation, and is entirely free of lubrication or other service requirements. After a period of use, the wear plates between the beams may easily be replaced when necessary.

Having now described my invention and in what manner the same may be used, what I claim as new and desire to protect by Letters Patent is:

1. In a vehicle suspension, a walking beam pivotally mounted at one end on the frame of the vehicle, an axle carried by an intermediate portion of said walking beam, a rocking beam pivotally mounted at one end on the frame of the vehicle, and a spring directly over said axle engaging said vehicle and said rocking beam to support the vehicle, said rocking beam engaging said walking beam at a point directly over said axle under light load conditions and engaging said walking beam progressively further from its fulcrum on said vehicle as said spring is compressed under heavier loads.

2. A vehicle suspension comprising a walking beam pivotally mounted at one end on the frame of the vehicle, an axle carried by an intermediate portion of said walking beam, a rocking beam pivotally mounted on the frame of the vehicle near the other end of the walking beam and bearing on said walking beam in a rocking contact, and a spring engaging said vehicle and engaging on said rocking beam directly over said axle to support the vehicle, said rocking beam engaging said walking beam at a point directly over said axle under conditions of light load and engaging said walking beam progressively further from the fulcrum of said walking beam and closer to the fulcrum of said rocking beam to increase the mechanical advantage and vary the spring rate of said spring as said spring is compressed in response to increased loading.

3. In a vehicle suspension, a longitudinal walking beam pivotally mounted at one end on the frame of the vehicle, an axle carried by an intermediate portion of said walking beam, a rocking beam pivotally mounted at one end on the frame of the vehicle, and a spring having one end engaging said vehicle to support the vehicle and its other end engaging said rocking beam directly over said axle, said rocking beam engaging said walking beam in rocking contact from a point forward of the axle to a point rearward of the axle upon flexing of said spring and relative movement of said beams.

4. In a vehicle suspension, a longitudinal walking beam pivotally mounted at one end on the frame of the vehicle, an axle carried by an intermediate portion of said walking beam, a shock absorber linking the other end of said walking beam with the frame of the vehicle, a rocking beam pivotally mounted at one end on the frame of the vehicle adjacent said shock absorber and engaging said walking beam in rocking contact in the region directly over said axle, and a spring having one end engaging said vehicle to support the vehicle and its other end engaging said rocking beam directly over said axle.

5. In a vehicle suspension, a longitudinal walking beam pivotally mounted at one end on the frame of the vehicle, an axle carried by an intermediate portion of said walking beam, a rocking beam pivotally mounted at one end on the frame of the vehicle and engaging said walking beam in rocking contact in the region directly over said axle, a spring seat in said rocking beam directly over said axle, a spring seat on the vehicle frame vertically above said axle, and a vertical coil spring having its ends disposed in said seats to support the vehicle.

ROBERT W. POINTER.

REFERENCES CITED

The following references are of record in the file of this patent:

UNITED STATES PATENTS

| Number | Name | Date |
| --- | --- | --- |
| 1,148,590 | Keneval | Aug. 3, 1915 |
| 1,182,141 | Brown et al. | May 9, 1916 |
| 1,539,272 | Prescott | May 26, 1925 |
| 1,848,783 | Hortsmann | Mar. 8, 1932 |
| 1,907,927 | Wolfard | May 9, 1933 |
| 2,086,721 | Martins | July 13, 1937 |
| 2,109,074 | Nilsson | Feb. 22, 1938 |
| 2,352,446 | Pointer | June 27, 1944 |

FOREIGN PATENTS

| Number | Country | Date |
| --- | --- | --- |
| 655,400 | Germany | Jan. 14, 1938 |